United States Patent [19]

Bot

[11] 4,343,497

[45] Aug. 10, 1982

[54] FIXED POINT DEVICE BETWEEN PIPEWORK AND A SUPPORT

[75] Inventor: Jean-Yves Bot, Fontenay Sous Bois, France

[73] Assignee: Framatome, Courbevoie, France

[21] Appl. No.: 172,848

[22] Filed: Jul. 24, 1980

[30] Foreign Application Priority Data

Jul. 25, 1979 [FR] France ................................ 79-19169

[51] Int. Cl.³ .............................................. F16L 3/10
[52] U.S. Cl. ..................................... 285/61; 285/286; 285/330
[58] Field of Search ................... 285/61, 64, 330, 202, 285/19, 286; 248/49, 57

[56] References Cited

U.S. PATENT DOCUMENTS

| | | | |
|---|---|---|---|
| 1,884,602 | 10/1932 | Dillhoefer | 285/330 X |
| 2,120,077 | 6/1938 | Schmidt | 285/330 X |
| 3,195,561 | 7/1965 | Sovitzky | 285/61 |
| 3,414,220 | 12/1968 | Walker | 285/61 X |

FOREIGN PATENT DOCUMENTS

| | | |
|---|---|---|
| 1170250 | 9/1958 | France ................................ 285/61 |
| 2300287 | 9/1976 | France . |
| 2301764 | 9/1976 | France . |
| 2317736 | 2/1977 | France . |
| 2327477 | 5/1977 | France . |

*Primary Examiner*—Dave W. Arola
*Attorney, Agent, or Firm*—Pollock, Vande Sande & Priddy

[57] ABSTRACT

A connection device of fixed point type between a pipework component and a support, which device is capable of absorbing the forces applied to the pipework in every direction in both normal operation and under emergency conditions. The device assures the connection, at a fixed point, of pipework equipped with a sleeve and a frame anchored to a structure. The sleeve includes two opposite shoulders applied against two parallel and opposite bearing surfaces on the frame, and at least one prismatic bearing surface consisting of at least two small plane faces parallel with the axis of the pipework. The frame comprises at least one prismatic seating consisting of small plane faces parallel with the axis of the pipework, arranged to be equal in number to the small faces of the bearing surface so as to form in cross-section a polygon similar to the polygon formed by a cross-section of the bearing surface, which engages with slight clearance in the seating so as to prevent rotation of the pipework.

6 Claims, 2 Drawing Figures

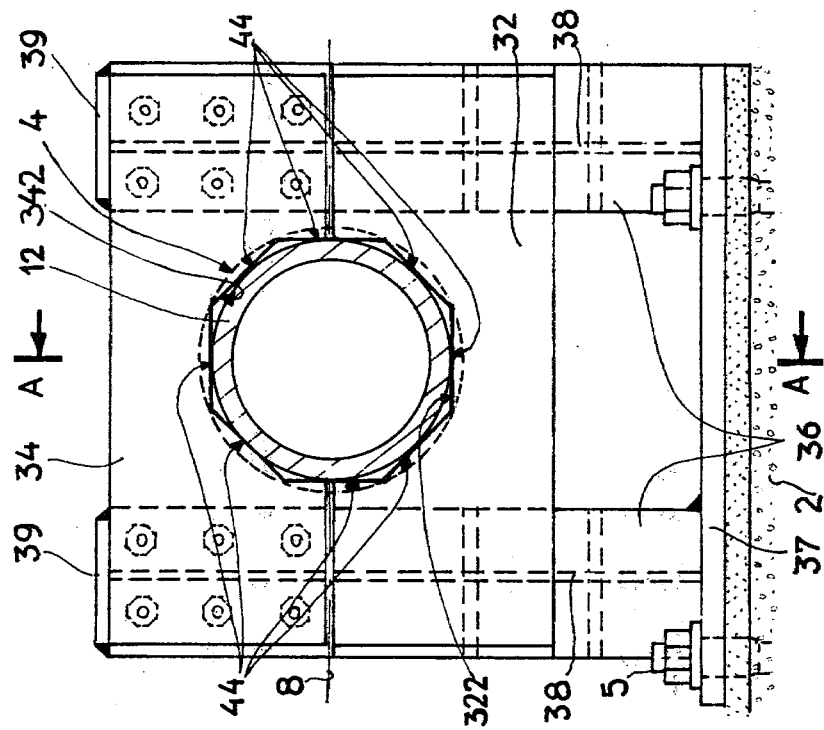
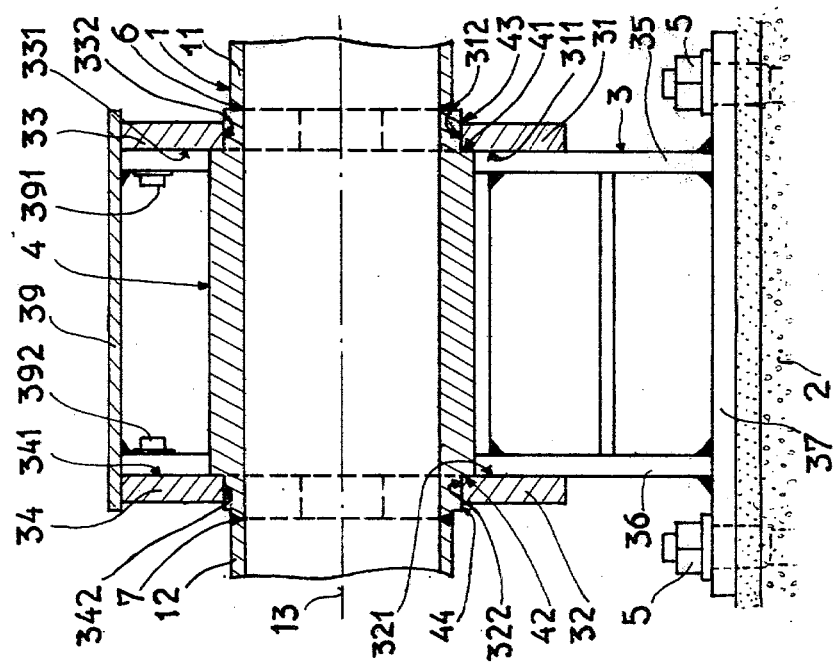

FIXED POINT DEVICE BETWEEN PIPEWORK AND A SUPPORT

FIELD OF THE INVENTION

The object of the present invention is a connection device of fixed point type between a piping component and a support, which device is capable of absorbing the forces applied to the piping in every direction both in normal operation and under emergency conditions.

This device is intended for piping in which it is required to achieve points fixed with respect to supporting structures, especially in a nuclear power plant.

BACKGROUND OF THE INVENTION

In light-water nuclear power stations various circuits exist which convey fluid at high pressure and temperature. Safety conditions prescribe that these circuits preserve the integrity of their operation with respect both to themselves and to the destruction which they can cause to neighboring installations. This integrity of operation must be assured not only for normal conditions of operation, but also for emergency conditions.

In general, connections of supporting members by welding onto piping generate residual stresses which become added to those due to the internal pressure, to expansions and to accidental forces. The elimination of such connections is desirable, more especially as obligatory inspection of them in service involves a supplementary charge.

Various types of connections of fixed point type between piping and a support are known. A usual device includes an intermediate piece welded to the wall of the piping and fixed by welding or bolting to a supporting structure capable of absorbing the forces.

Another device includes a U-shaped collar which surrounds the piping and which is fixed to a stirrup integral with the supporting structure. Blocks welded to the piping on opposite sides of the collar assure the immobilization of the piping.

Other devices described, for example, in French Patent Nos. 2,300,287 and 2,301,764 comprise a sleeve or a double annular sleeve which surrounds the piping. This sleeve is connected to the pipwork by a welded crown and is anchored in the wall through which the piping passes. This device assures anchorage in the wall as well as thermal insulation.

Other devices such as that described in French Pat. No. 2,317,736 includes a conical crown surrounding the piping to which it is attached by way of a reinforced piece of the piping. This crown is fixed at its outer periphery to a supporting structure. This design tolerates small angular deviations of the piping.

Another fixed point device for piping is disclosed in French Pat. No. 2,327,477. It comprises a disc which surrounds the piping to which it is welded, and is housed in a hollow crown fixed to the supporting structure.

The prior art devices are satisfactory for absorbing the axial forces or the forces in shear. In order to absorb the forces of torsion or bending, these devices must be combined with abutments where high stress levels in the connecting welds to the piping must be allowed.

SUMMARY OF THE INVENTION

The object of the present invention is a connection device of fixed point type between piping and a support, which enables any axial and lateral forces to be absorbed, without any welded connection between the piping and the support. The level of the stresses in the welds performed otherwise on the piping is not very high. Inspection of the welds on the piping may be done easily and rapidly.

The device in accordance with the invention assures the fixed point connection of piping equipped with a sleeve and a frame anchored to a structure, and is essentially characterized by the fact that the sleeve includes firstly two opposite shoulders applied against two parallel and opposite bearing surfaces on the frame, and secondly at least one prismatic bearing surface formed by at least two small plane faces parallel with the axis of the piping, and by the fact that the frame comprises at least one prismatic seating formed by small plane faces parallel with the axis of the piping, arranged to be equal in number to the small faces of the bearing surface so as to form in cross-section a polygon similar to the polygon formed by a cross-section of the bearing surface, which engages with slight clearance in the seating so as to prevent rotation of the piping.

The invention will now be described in greater detail with reference to an embodiment given by way of example and represented in the attached drawings.

BRIEF DESCRIPTION OF THE DRAWINGS

FIG. 1 is a section along the axis of the piping, of the connection device in accordance with the invention.

FIG. 2 is a view from the left of FIG. 1.

DETAILED DESCRIPTION

The device represented in FIGS. 1 and 2 supports the piping 1 on a structure 2 which is, for example, a solid mass of concrete. The connection is assured by a frame 3 of mechano-welded type the sole 37 of which is endowed with a contour enabling a good hold onto the concrete. This frame is anchored to the support 2 by anchor bolts 5.

An annular and hollow rigid sleeve 4 is mounted coaxially between the sections 11 and 12 of the piping so as to channel the fluid between these two sections. It is welded to these two sections by annular welds 6 and 7.

The sleeve 4 includes two shoulders which form two annular bearing surfaces 41 and 42. These two bearing surfaces are plane and perpendicular to the axis 13 of the piping. It includes furthermore prismatic bearing surfaces which are spaced along the axis 13. Each of the prismatic bearing surfaces consists of at least two small faces 43 or 44 which are plane and parallel with the axis 13 of the piping. They are arranged at equal distances from the axis 13 so as to form in cross-section (a section perpendicular to the axis of the piping) a regular polygon. The prismatic bearing surfaces 43 and 44 are adjacent respectively to the plane annular bearing surfaces 41 and 42. Preferably the prismatic bearing surfaces 43 and 44 are arranged on opposite sides of the plane annular bearing surfaces 41 and 42 and bound a length of the sleeve of great thickness.

The frame 3 comprises two cheeks 31 and 32 which are mounted perpendicular to the axis 13 of the piping. They are fixed respectively onto wings 35 and 36 which are welded to the sole 37. These wings are joined by reinforcing webs 38. The frame comprises furthermore two removable cheeks 33 and 34 which are mounted perpendicular to the axis 13. These cheeks 33 and 34 are joined by a cover 39. The cheeks 31 and 33 are associated so as to form respectively bearing surfaces 311 and 331 which are located in one and the same plane perpendicular to the axis 13. Similarly the cheeks 32 and 34 are associated so as form respectively bearing surfaces 321 and 341 which are located in one and the same plane perpendicular to the axis 13. The opposite bearing surfaces, 311-331 on the one hand and 321-341 on the other, are applied respectively against the opposite plane annular bearing surfaces 41 and 42 on the sleeve. The two associated cheeks 31 and 33 form a prismatic seating consisting of small plane faces 312 and 332. These small plane faces arranged on the cheeks 31 and 33 are parallel with the axis 13 of the piping. They are arranged to be equal in number to the small faces 43 so as to form in cross-section a regular polygon. Similarly the two associated cheeks 32 and 34 form a prismatic seating consisting of the small plane faces 322 and 342. These small plane faces arranged on the cheeks 32 and 34 are parallel with the axis 13 of the piping. They are arranged to be equal in number to the small faces 44 so as to form in cross-section a regular polygon. Each cheek forms half of a prismatic seating.

The prismatic bearing surface on the sleeve, formed by the small faces 43 engages with slight clearance in the seating formed by the small faces 312 and 322 on the cheeks 31 and 33. Similarly the prismatic bearing surface on the sleeve, formed by the small faces 44, engages with slight clearance in the seating formed by the small faces 322 and 342 on the cheeks 32 and 34.

Each prismatic bearing surface on the sleeve includes two small faces 43 or 44 arranged perpendicular to the separation 8 between the cheeks 31 and 33 or between the cheeks 32 and 34. Each of these small faces fronts two small half faces arranged in two associated cheeks. Preferably each prismatic bearing surface 43 or 44 and each prismatic seating 312-332 or 322-342 is formed of eight small faces so as to form in cross-section an octagon.

The frame comprising the cheeks 31 and 32 is fixed first of all onto the supporting concrete structure 2. The sleeve 4 the length of which is very slightly less than the distance between the cheeks 31 and 32 is introduced between them. The cheeks 33 and 34 are then assembled onto the wings 35 and 36 in a rigid and dismountable manner bolts 391 and 392. The associated cheeks surround with a small clearance (necessary for expansion) the prismatic bearing surfaces machined in the sleeve. If dismounting is not necessary, the cheeks 33 and 34 may be fixed by welding. All of the forces (and especially the torsion) are transmitted from the piping to the frame 3 and then to the structure 2.

What is claimed is:

1. Means for establishing a fixed point connection between piping and a supporting structure capable of absorbing axial, flexional and torsional forces applied to said piping, said means comprising a support structure comprising
   (a) a sleeve mounted coaxially between two sections of said piping and welded to said sections, said sleeve having two plane and opposite bearing surfaces perpendicular to the axis of said piping, said support structure having corresponding opposite plane bearing surfaces in abutment with said bearing surfaces of said sleeve said bearing surfaces of support structure also being perpendicular to the axis of said piping;
   (b) said sleeve further having at least two prismatic bearing surfaces each formed by at least two plane faces parallel with the axis of said piping; and
   (c) said support structure comprising at least two prismatic seats each formed by plane faces parallel with the axis of said piping and equal in number to and closely surrounding said plane faces on said prismatic bearing surface;
   (d) whereby, upon engagement of said prismatic bearing surfaces against said prismatic seats, rotation of said piping relative to said support structure is effectively prevented and said abutting bearing surfaces effectively preventing axial movement of said piping relative to said support structure.

2. Means according to claim 1, wherein said sleeve comprises two said prismatic bearing surfaces each adjacent to a said plane annular bearing surface and each engaged in a said prismatic seat on said support structure.

3. Means according to claim 1, wherein said prismatic bearing surfaces on said sleeve are arranged on opposite sides of said plane annular bearing surfaces on said sleeve.

4. Means according to claim 1, wherein each prismatic bearing surface and each associated prismatic seat includes eight plane faces.

5. Means according to clam 4, wherein said faces in cross section form a regular polygon.

6. Means according to claim 1 or 3, wherein each prismatic seat on said support structure is formed of two parts capable of being rigidly and dismountably assembled, and each forming one half of each said seat.

* * * * *